United States Patent [19]

Dugge et al.

[11] Patent Number: 4,944,233
[45] Date of Patent: Jul. 31, 1990

[54] HATCH ARRANGEMENT FOR COVERED HOPPER CARS

[75] Inventors: Richard H. Dugge, St. Louis County, Mo.; John W. Coulborn, Harris County, Tex.

[73] Assignee: ACF Industries, Incorporated, Earth City, Mo.

[21] Appl. No.: 364,872

[22] Filed: Jun. 12, 1989

[51] Int. Cl.⁵ .................... B61D 39/00; B65D 45/00
[52] U.S. Cl. .................... 105/377; 292/256.5; 220/244; 220/314
[58] Field of Search ............. 105/377; 292/256.5; 220/314, 323, 243, 242, 251, 244

[56] References Cited

U.S. PATENT DOCUMENTS

| 3,041,099 | 6/1962 | Stewart et al. | 296/256.5 |
| 3,375,612 | 4/1968 | Busuttil | 220/243 X |
| 4,248,160 | 2/1981 | Carney, Jr. et al. | 220/314 X |
| 4,388,873 | 6/1983 | Carleton et al. | 220/324 X |

Primary Examiner—Andres Kashnikow
Assistant Examiner—Virna Lissi Mojica
Attorney, Agent, or Firm—Polster, Polster and Lucchesi

[57] ABSTRACT

A hatch cover assembly (1) for a railway car (C). A hatch cover (7) is hingedly mounted to a roof (R) of the car for pivotal movement of the cover to open and close a hatch. The axis about which hinging movement occurs is perpendicular to the center line (CL) of the car. A locking strap (31) is rotationally mounted to the cover for movement between a cover locking position and a cover unlocking position. The longitudinal axis of the strap when the cover is in its locking position is also perpendicular to the center line of the car. A latch mechanism (61) adjacent the cover latches the strap in its cover locking position to prevent movement of the strap.

15 Claims, 3 Drawing Sheets

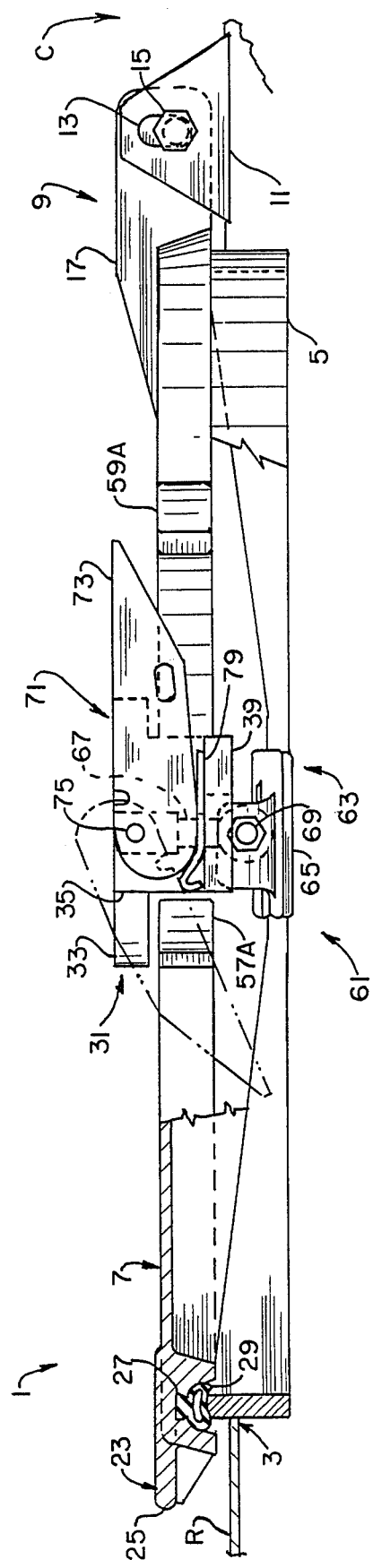
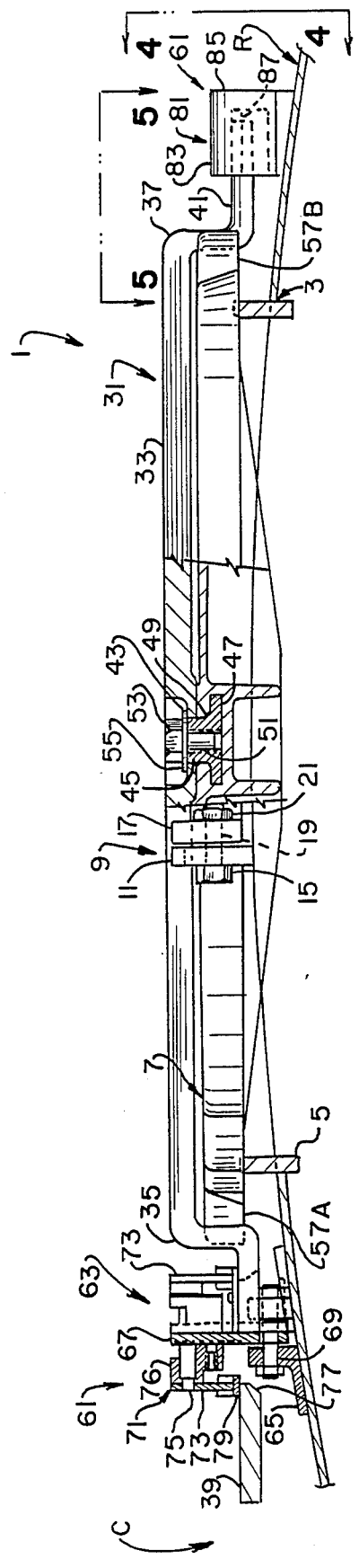

HATCH ARRANGEMENT FOR COVERED HOPPER CARS

BACKGROUND OF THE INVENTION

This invention relates to railway cars and, more particularly, to a hatch cover assembly for a railway hopper car.

Railway cars such as covered hopper railway cars are used to move various types of lading. Such a car typically has a number of hoppers into which lading is loaded through an opening or hatch in the roof of the car. The hatch has a cover and the cover has an associated latching mechanism by which the hatch can be locked in a closed position when the car is moved. The hatch for each hopper is aligned along the center line of the railway car and the hatch is oriented so its opening and closing movement is also the center line of the railway car. Conventionally, and as shown, for example, in U.S. Pat. No. 4,248,160 the latching mechanism for the hatch is mounted on top of the hatch cover and its axis of operation is also along the center line of the car.

The American Association of Railroads (AAR) has established rules and regulations with respect to the design of railway cars such as covered hopper cars. One of the elements covered by these specifications is the height of the car. Included in this specification is not only the height of the car, but also the height of the hatch, hatch cover, and latching mechanism for the hatch cover. If, the height (or profile) of the hatch cover and its associated latching mechanism could be reduced, the roof height of the car could be correspondingly raised; so while the overall height remains within the AAR specifications, the carrying capacity of the car could be substantially increased.

SUMMARY OF THE INVENTION

Among the objects of the present invention is the provision of a hatch cover assembly for a railway car; the provision of such an assembly which is substantially lower in height than conventional hatch cover assemblies, therefor allowing the roof of the car to be raised while maintaining the overall height of the car within AAR specifications; and, the provision of such hatch cover assembly which is easy to use yet securely latches the cover over a hatch to protect the lading in the car.

Briefly, a hatch cover assembly for a railway car comprises a hatch cover hingedly mounted to a roof of the car for pivotal movement of the cover to open and close a hatch in the roof of the car. The axis about which the hinging movement occurs is perpendicular to the center line of the car. A locking strap is rotationally mounted to the hatch cover for movement between a cover locking position and a cover unlocking position. Movement of the strap to its cover locking position prevents movement of the cover to open the latch. The longitudinal axis of the strap, when the cover is in its locking position, is perpendicular to the center line of the car. A latch mechanism adjacent the cover latches the strap in its cover locking position to prevent movement of the strap. Orientation of the strap with respect to the center line of the car and the location of the latching mechanism, permits the hatch cover assembly to have a substantially lower profile with respect to the roof of the car than conventional hatch cover assemblies. This allows the roof of the car to be raised which, in turn, increases the load carrying capacity of the car.

Other objects and features will be in part apparent and in part pointed out hereinafter.

BRIEF DESCRIPTION OF THE DRAWINGS

In the drawings.

FIG. 2 is a side elevational view of the assembly;

FIG. 3 is a rear elevational view, partly in section, of the assembly;

Corresponding reference characters indicate corresponding parts throughout the several views of the drawings.

DESCRIPTION OF THE PREFERRED EMBODIMENT

Figure 1:
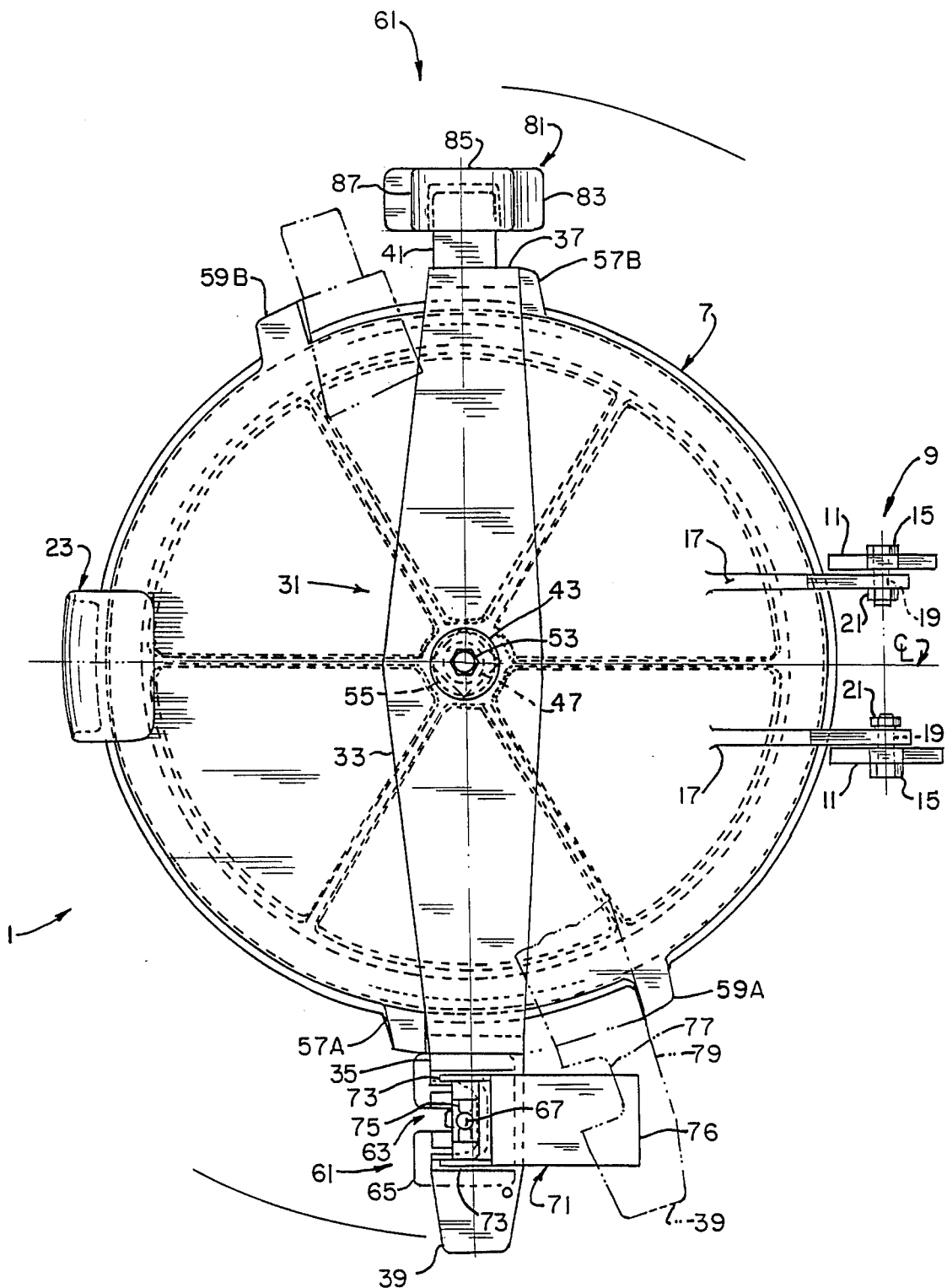
FIG. 1 is a top plan view of a hatch cover assembly of the present invention.
Figure 4:
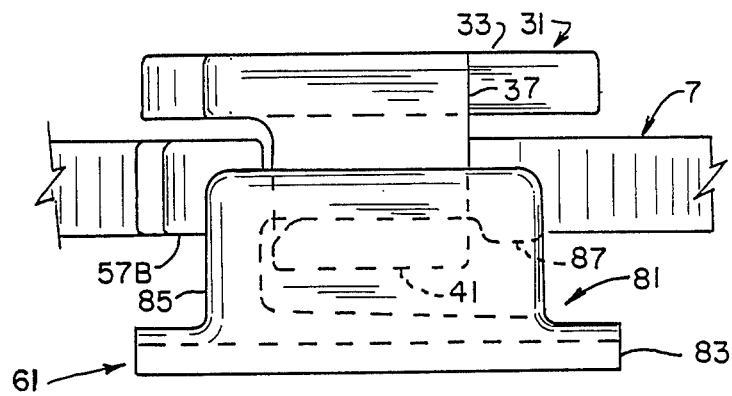
FIG. 4 is a view taken along line 4—4 in FIG. 3.
Figure 5:
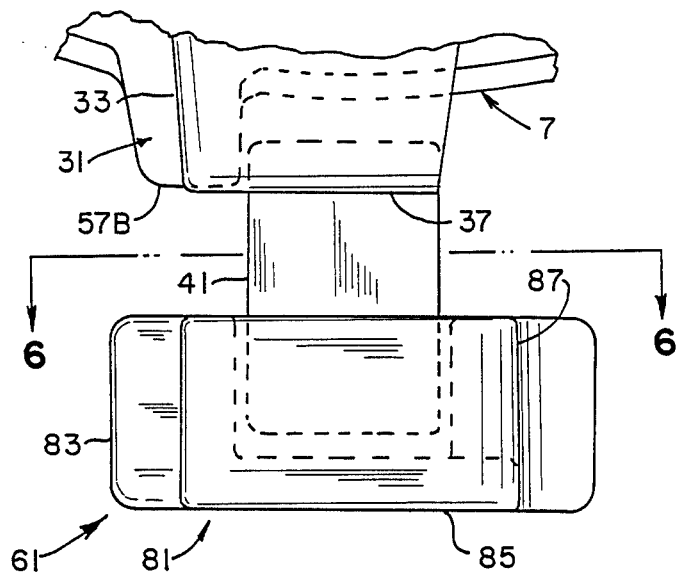
FIG. 5 is a view taken along line 5—5 in FIG. 3.
Figure 6:
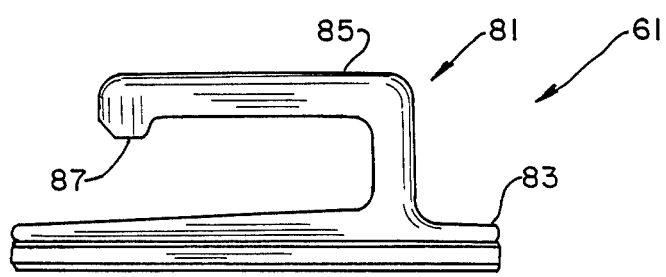
FIG. 6 is a view taken along line 6—6 in FIG. 5.

Referring now to the drawings, a hatch cover assembly 1 for a railway car C is for use on a covered hopper type of railway car. Referring to FIGS. 2 and 3, car C has one or more hoppers H which are filled with a lading transported in the car. Car C has a roof R which slopes downwardly from the center line of the car toward each side thereof (as shown in FIG. 3). An opening 3 is formed in the roof to provide an inlet by which lading is loaded into the car. The opening is circular in shape and is defined by a circumferential ring 5. As shown in FIG. 2 and 3, the height of ring 5 is such as to extend slightly above the line of roof R.

Assembly 1 includes a round hatch cover 7 and a hinge assembly 9 for hingedly mounting the hatch cover to the roof of the car. Assembly 9 includes a pair of spaced apart mounting brackets 11 which are mounted parallel to each other and to the center line CL of car C. Brackets 11 are spaced apart an equal distance on either side of the center line. Each bracket has a vertical slot 13 sized to receive a bolt 15. Hatch cover 7 has a pair of spaced apart, parallel rearward extensions 17. The spacing between the extensions is less than the spacing between the brackets and the length of the extensions is such that they fit between the brackets. Each extension has a transverse bore 19 through which the respective bolts 15 fit. Respective nuts 21 capture the bolts 15 to mount the hatch cover to the hinge assembly. When mounted as above described, the center line of the hatch cover corresponds to the center line of the railway car. However, the axis about which the hatch cover pivots, when it is raised and lowered to open and close the hatch, is perpendicular to the center line of the car.

To facilitate raising and lowering the hatch cover, an extension 23 projects forwardly from the front of the hatch cover. The extension may be integrally formed with the hatch cover, and has a forwardly extending lip 25 which can be gripped by a worker to raise and lower the hatch. As shown in FIG. 2, a circumferential groove 27 is formed on the underside of the hatch cover, the groove having the same diameter as that of ring 5. A circumferential seal 29 fits in groove 27 to form a seal with ring 5 when the hatch cover is closed.

Assembly 1 next includes a locking strap 31 which is rotationally mounted to hatch cover 7 for movement between a cover locking position and a cover unlocking position. Strap 31 has a central section 33 the length of which exceeds the diameter of hatch cover 7. Each end of section 33 is downwardly turned as indicated at 35 and 37 respectively. These downwardly turned sections extend slightly below the bottom of hatch cover 7 and each is then turned outwardly to form a respective end extension 39 and 41. End extension 39 extends outwardly a greater distance than end extension 41. In addition, the width of end extensions 39 and 41 is less than that of section 33. As shown in FIG. 1, section 33 increases in width from the ends thereof toward the center of the hatch cover.

As noted, strap 31 is rotationally mounted to the top of hatch cover 7. Section 33 of the strap has a circular recess 43 formed therein, the center of this recess being at the center line of the railway car. A central opening 45 is formed in the bottom of this recess. Hatch cover 7 has a collar 47 formed in it, the collar, for example, being a steel insert molded in place in the hatch cover. The collar has an upstanding or upright projection 49 extending upwardly through opening 45. Projection 49 has a central threaded bore 51 into which is received a bolt 53. A washer 55 fits between the head of bolt 53 and collar 49, the outer diameter of the washer being greater than that of projection 49. Strap 31 is now free to rotate about collar 49 and is attached to the hatch cover by means of the bolt and washer.

The rotational movement of strap 31 is limited by a pair of spaced apart lugs 57A and 59A which project outwardly from the side of the hatch cover to engage end extension 39 of the strap. A second pair of spaced apart lugs 57B and 59B are diametrically opposed to the first pair of lugs and engage end extension 41 of the strap to aid in limiting the rotational movement of the strap. When strap 31 is rotated to the position shown in FIG. 1, which is the locking position for hatch cover 7, the center line of the strap is perpendicular to the center line of the railway car.

Assembly 1 further includes a latching mechanism 61 which is adjacent hatch cover 7. The latching mechanism is used to latch or lock strap 31 in its cover locking position to prevent movement of the strap. The latch mechanism first includes a hold-down means 63 which engages end 39 of the strap when the strap is moved to its cover locking position. A hatch hold-down lug 65 is mounted to roof R of the railway car. A post 67 is attached to the lug by a bolt 69, the post being mounted vertically to the lug. An over-center cam 71 has an inverted U-shape. Side plates 73 of the cam are attached to post 67 by a connector pin 75. A top plate 76 extends between side plates 73 of the cam, this top plate beginning at a point forward of the connection point of the side plates to port 67. Plate 76 facilitates manual movement of the cam between its dashed line position shown in FIG. 2, and its solid line position shown in the Figure. As shown in FIGS. 1 and 3, end extension 39 of the latch has a generally rectangular shaped notch 77. The width of this notch is less than the spacing between the side plates of the cam. The notch facilitates movement of end extension 39 beneath cam 71. Typically, the latch is in its dashed line position, shown in FIG. 2, when latch 31 is moved to the solid line position shown in FIG. 1. This is the locking position for the hatch cover. When the latch is so positioned, a wear plate 79, affixed to the top of end extension 39, is beneath the cam. Rotation of the cam to is solid line position shown in FIG. 2 now locks end 39 of the latch in place.

In addition to hold-down 63, latch mechanism 61 also includes a retainer 81. This retainer is engaged by end 41 of the latch when the latch is moved to its cover locking position. Retainer 81 includes a lug 83 secured to roof R of the railway car. The lug has an upwardly extending C-shaped retainer 85 integrally formed with the lug. End extension 41 of the strap is received in the open end of retainer 85. A depending lip 87 is formed at the upper end of the opening to aid in retaining end 41 of the strap in place.

The advantage of the hatch cover assembly above described is that the profile of the assembly is lower than that of conventional hatch cover assemblies. For example, the hatch cover assembly above described is two inches (2") lower. Since the height of a covered hopper car is specified by American Association of Railroads (AAR) specifications, lowering the profile of the hatch cover assembly means roof R of the railway car can be raised an equivalent distance without violating the specifications. This translates into a volumetric increase in the lading capacities of the railway car. For example, such lading capacity increase may be on the order of two and one-half percent (2.5%) or approximately one-hundred-fifty cubic feet (150 cu. ft.).

Having thus described the invention, what is claimed and desired to be secured by Letters Patent is:

1. A hatch cover assembly for a railway car comprising:
   a hatch cover hingedly mounted to a roof of the car for pivotal movement of the cover to open and close a hatch formed in the roof, the hinge axis about which pivotal movement of the cover occurs being perpendicular to a center line of the car;
   a locking strap pivotally mounted atop the hatch cover for movement between a cover locking position and a cover unlocking position, movement of the strap to its cover locking position preventing movement of the cover to open the hatch, the longitudinal axis of the strap when in the cover locking position being substantially perpendicular to the center line of the car; and,
   latching means adjacent the cover for latching the strap in its cover locking position to prevent movement of the strap whereby the orientation of the strap with respect to the center line of the car and the location of the latching means permits the hatch cover assembly to have a substantially lower profile with respect to the roof of the car than conventional hatch cover assemblies thereby allowing the roof of the car to be raised which, in turn, increases to load carrying capacity of the car.

2. The assembly of claim 1 wherein the ends of the strap project beyond the side of the hatch and the latching means includes hold-down means engaging one end of the strap when it is moved to its cover locking position.

3. The assembly of claim 2 wherein the hold-down means comprises an over-center cam having a cam surface movable into contact with the end of the strap to bear against the strap and prevent its movement.

4. The assembly of claim 3 wherein the latching means further includes retainer means engaged by the other end of the strap when it is moved to its cover locking position.

5. The assembly of claim 1 wherein the hatch is defined by a ring over which the hatch cover fits, and the assembly further includes sealing means the underside of the cover to form a seal between the cover and the ring when the strap is moved to its locking position.

6. A hatch cover assembly for a railway car comprising:

a hatch cover hingedly mounted to a roof of the car for pivotal movement of the cover to open and close a hatch formed in the roof, the axis about which pivotal movement of the cover occurs being substantially perpendicular to a center line of the car;

a locking strap and means for rotatably mounting the strap to the top of the hatch cover for movement between a cover locking position and a cover unlocking position, movement of the strap to its cover locking position preventing movement of the cover to open the hatch, the longitudinal axis of the strap when in the cover locking position being substantially perpendicular to the center line of the car, and the strap having a circular recess formed therein, the center of the recess being at the center line of the car, with a central opening formed in the bottom of the recess;

a collar formed in the hatch cover and having a central upstanding projection extending upwardly through the opening;

attachment means for securing the strap to the collar; and, latching means adjacent the cover for latching the strap in its cover locking position to prevent movement of the strap whereby the orientation of the strap with respect to the center line of the car and the location of the latching means permits the hatch cover assembly to have a substantially lower profile with respect to the roof of the car than conventional hatch cover assemblies thereby allowing the roof of the car to be raised which, in turn, increases to load carrying capacity of the car.

7. The assembly of claim 6 wherein the projection has central threaded bore therein and the attachment means includes a bolt threadably received in the bore for thereby allowing the strap to rotate about the collar.

8. A hatch cover assembly for a railway car comprising:

a hatch cover hingedly mounted to a roof of the car for pivotal movement of the cover to open and close a hatch formed in the roof, the axis about which pivotal movement of the cover occurs being perpendicular to a center line of the car;

a locking strap rotationally mounted to the hatch cover for movement between a cover locking position and a cover unlocking position, movement of the strap to its cover locking position preventing movement of the cover to open the hatch, the longitudinal axis of the strap when in the cover locking position being perpendicular to the center line of the car and the ends of the strap projecting beyond the side of the hatch; and, latching means adjacent the cover for latching the strap in its cover locking position to prevent movement of the strap whereby the orientation of the strap with respect to the center line of the car and the location of the latching means permits the hatch cover assembly to have a substantially lower profile with respect to the roof of the car than conventional hatch cover assemblies thereby allowing the roof of the car to be raised which, in turn, increases to load carrying capacity of the car, the latching means including hold-down means engaging one end of the strap when it is moved to its cover locking position, the hold-down means comprising an over-center cam having a cam surface movable into contact with the end of the strap to bear against the strap and prevent its movement, and the latching means further including retainer means engaged by the other end of the strap when it is moved to its cover locking position.

9. The assembly of claim 8 wherein the cam is rotatably mounted to a post extending upward from a lug to the roof of the car.

10. The assembly of claim 9 wherein the end extension engaged by the cam has a notch formed therein for the extension to fit beneath the cam when the strap is moved to its locking position.

11. The assembly of claim 1 further including a wear plate attached to the top face of the end extension contacted by the cam to prolong the useful life of the strap.

12. The assembly of claim 8 wherein the retainer means includes a lug secured to the car, and an upwardly extending C-shaped retainer integrally formed with the lug, the end extension of the strap being received in the open end of the retainer when the strap is moved to its locking position.

13. The assembly of claim 12 wherein the retainer has a lip at the upper end of the opening to retain the end extension in place.

14. The assembly of claim 8 further including a pair of spaced apart lugs projecting outwardly from the side of the hatch to engage an end extension of the strap and limit its movement.

15. The assembly of claim 14 further including a second pair of spaced apart lugs diametrically opposed to the first said pair for engaging the other end extension of the strap.

* * * * *